July 7, 1953 L. MEDITZ 2,644,383
INVERTOSCOPE FOR PHOTOGRAPHIC CAMERAS
Filed Aug. 19, 1950
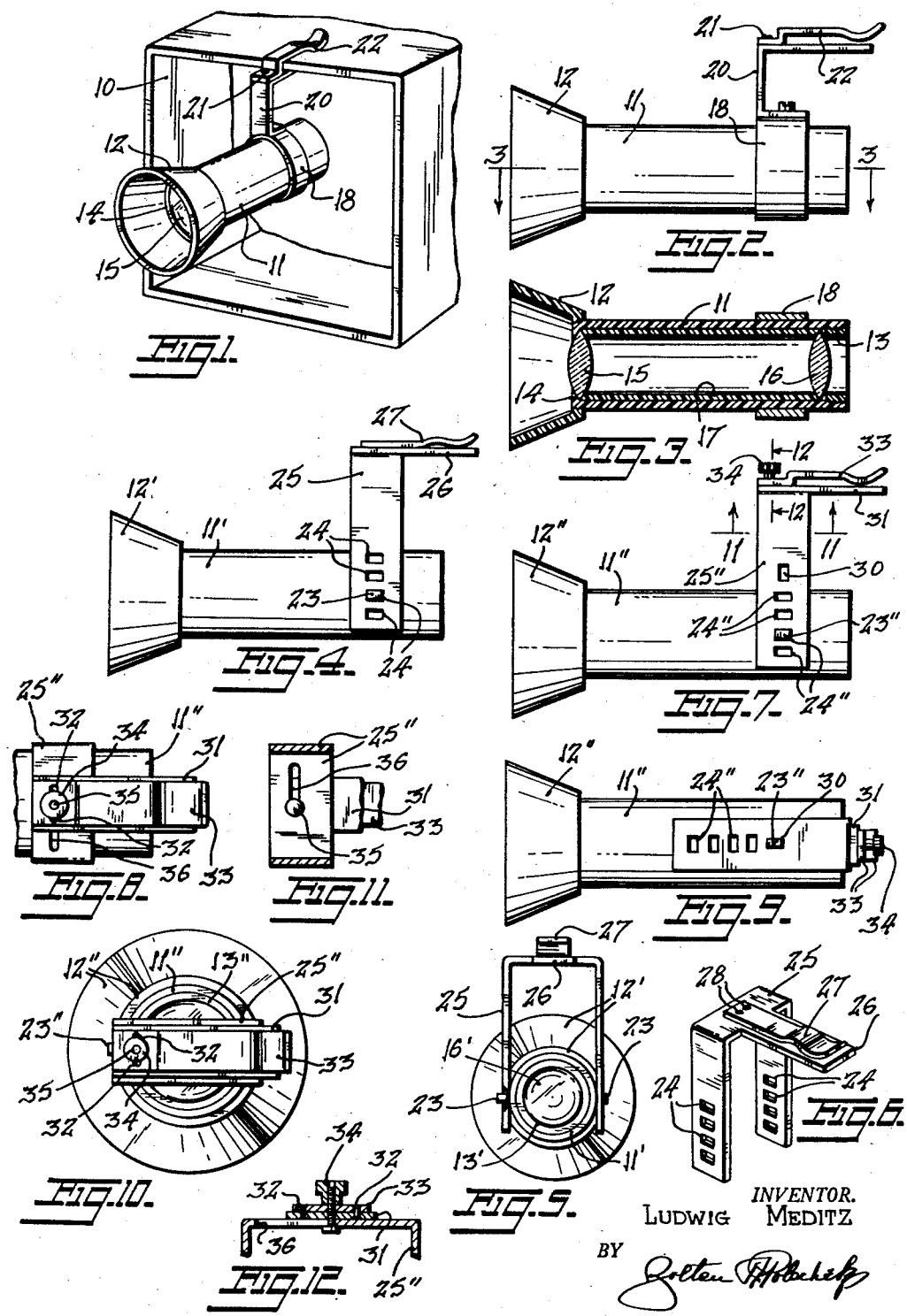
INVENTOR.
LUDWIG MEDITZ
BY Zoltan Holcheh
ATTORNEY Patented July 7, 1953

2,644,383

UNITED STATES PATENT OFFICE 2,644,383

INVERTOSCOPE FOR PHOTOGRAPHIC CAMERAS

Ludwig Meditz, New York, N. Y.

Application August 19, 1950, Serial No. 180,494

3 Claims. (Cl. 95—44)

This invention relates to an invertoscope attachment for photographic cameras of the type which include a viewing hood through which an image focused on a ground glass screen within the camera can be surveyed.

In known manner, the said image is projected on said screen in inverted condition so that when viewing the same allowance must be made for the inverted condition thereof. One object of the invention is the provision of a device removably mountable in the opening of a camera hood to reinvert and magnify the image projected on the ground glass screen.

Another object of the invention is to construct the device in such manner that the same is adjustably centerable in camera hoods of various sizes.

Still another object of the invention is to construct the device in such manner that the same is foldable into a compact unit for carrying and storing purposes.

A further object of the invention is to construct the device in an economical manner.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the invertoscope attachment of the invention attached to the hood of a camera, the said hood being only partially shown in a diagrammatic manner.

Fig. 2 is a side elevation of the attachment, per se.

Fig. 3 is a longitudinal sectional view on line 3—3 of Fig. 2.

Fig. 4 is a side elevation of a modified form of the invention.

Fig. 5 is an end view of Fig. 4.

Fig. 6 is a perspective view of the clamp portion used in the modification of the invention shown in Figs. 4 and 5.

Fig. 7 is a side elevational view of another modified form of the invention.

Fig. 8 is an enlarged fragmentary plan view of a portion of Fig. 7.

Fig. 9 is a view similar to Fig. 7, but with certain parts in modified positions.

Fig. 10 is an enlarged end view of the device with the parts in the positions of Fig. 9.

Fig. 11 is an enlarged sectional view on line 11—11 of Fig. 7.

Fig. 12 is an enlarged sectional view on line 12—12 of Fig. 7.

The invertoscope attachment, according to the first form of the invention shown in Figs. 1 to 3, is applied to the hood 10 of a camera. The hood 10 is utilized to view on a ground glass screen within the camera the inverted image of the scene to be photographed. This is a normal procedure and is familiar to all those skilled in the art of photography.

According to the invention, the attachment includes a barrel 11 of suitable plastic or metallic material, said barrel being threaded externally at one end to receive a flared eye piece or cup 12, and being threaded internally at the other end to receive a retainer ring 13. At its eye piece end the wall of barrel 11 arcs inward slightly as at 14 to retain in the barrel a lens 15. The retainer ring 13 is also utilized to retain a second lens 16 within the barrel, the two lenses being maintained at a set spacing apart by a sleeve 17 loosely mounted therebetween.

When the device is mounted on the hood 10 as will be described hereinafter, the lens 16 serves to reinvert the inverted image displayed on the ground glass screen of the camera, and the lens 15 serves to enlarge the now upright image. The curvatures of the lenses 15 and 16 of course depend on the construction of the particular camera with which they are employed and on the results desired.

Secured on the barrel 11 as by a force fit is a collar 18 to which is secured the shorter side arm of a U-shaped member 20. Secured to the longer side arm of member 20 as by a screw 21 is a spring clip 22.

The construction is such that the device of the invention is mounted in the opening of hood 10 by engaging the longer arm of the U-shaped member beneath the top wall of the hood and the spring clip 22 above said wall. It will be seen that this securely holds the barrel 11 and its appurtenances in place.

A modified form of the invention is illustrated in Figs. 4, 5 and 6 wherein like parts are given the same reference numerals as hereinbefore with a prime added. In this form of the invention the barrel 11' is provided remote from its eye piece end with a pair of oppositely disposed, rectangularly cross-sectioned lugs 23. The lugs 23 are adapted to be engaged in holes 24 in the side arms of a yoke member 25. Each side arm of the yoke is provided with a plurality of the holes 24 spaced vertically one above the other so that the barrel is mountable at differential heights relative to the cross bar of the yoke. Projecting from the center portion of the yoke cross bar is an arm 26 above which extends a spring clip 27 whose base is secured to the cross bar of the yoke by screws or rivets 28.

The construction is such that the arm 26 is engaged beneath the upper wall of a camera hood and the spring clip 27 above said wall, the same as described above with reference to the spring clip 22; and by springing the side arms of the yoke the desired ones of the holes 24 can be engaged over the lugs 23.

Another modified form of the invention is illustrated in Figs. 7-12 wherein like parts are given the same reference numerals as hereinbefore with a double prime added. In this form of the invention each side arm of yoke 25″ is provided with a rectangular hole 30 above the holes 24″, the longer dimension of hole 30 however being aligned with the side arm rather than transverse thereto as in the case of the holes 24″. Thus, by engaging the lugs 23″ in the holes 30 the cross bar of the yoke is located across the end of barrel 11″ as shown in Figs. 9 and 10. This arrangement not only provides a protection for lens 16 but also facilitates storing and carrying the device.

Pivotally and slidably secured atop the cross piece of yoke 25″ is an arm 31 to which is secured by rivets 32 a spring clip 33, see Figs. 8 and 12. The arm and the clip cooperate as described hereinabove to secure the device in the opening of a camera hood. The arm 31 is secured atop the yoke by means of a finger nut 34 threaded onto a bolt 35 passing through the arm and also through a slot 36 in the yoke cross piece, see also Fig. 11.

The construction is such that when the device is in use the parts are in the positions of Figs. 7 and 8; but when the yoke is folded across the end of the barrel, the nut 34 is loosened, the arm 31 is turned into parallelism with the yoke cross piece and the bolt 35 is slid to the outer end of slot 36. This positions the parts in the compact manner of Figs. 9 and 10, with the parts positioned for easy storing or carrying.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An invertoscope for cameras having a walled hood through which an image focused on a ground glass screen within the camera can be viewed, which comprises a barrel threaded externally at one end and internally at the other end, an eye piece mounted on the externally threaded end, a retainer ring mounted in the internally threaded end, an internal annular flange at the eye piece end of the barrel, a lens mounted in the barrel against said ring to invert the said image, a lens mounted in the barrel against said flange to magnify the reinverted image, a sleeve within the barrel spacing apart said lenses, a pair of diametrally opposed rectangularly cross-sectioned lugs projecting from the barrel near the end away from the eye piece with the longer dimension aligned with the barrel, a yoke having a span equal to the diameter of the barrel, a plurality of vertically spaced holes in each side arm of the yoke, an opposed pair of said holes being engaged on said lugs to support the yoke transversely to the barrel, an arm projecting from the cross piece of the yoke beyond the end of the barrel, and a spring clip secured atop said arm, said arm being engaged beneath and the spring clip above the top wall of the hood.

2. An invertoscope for cameras having a walled hood through which an image focused on a ground glass screen within the camera can be viewed, which comprises a barrel threaded externally at one end and internally at the other end, an eye piece mounted on the externally threaded end, a retainer ring mounted in the internally threaded end, an internal annular flange at the eye piece end of the barrel, a lens mounted in the barrel against said ring to invert the said image, a lens mounted in the barrel against said flange to magnify the reinverted image, a sleeve within the barrel spacing apart said lenses, a pair of diametrally opposed rectangularly cross-sectioned lugs projecting from the barrel near the end away from the eye piece with the longer dimension aligned with the barrel, a yoke having a span equal to the diameter of the barrel, a plurality of vertically spaced holes in each side arm of the yoke, an opposed pair of said holes being engaged on said lugs to support the yoke transversely to the barrel, a rectangularly shaped hole in each said cross arm above the other holes with the longer dimension thereof transversely of the barrel, the lugs when engaged in the last said holes positioning the yoke astraddle the end of the barrel, a slot in the cross bar of the yoke extending from the center thereof to near one end thereof, a bolt passing through said slot, an arm pivotally mounted on said bolt, a spring clip secured atop said arm, and a finger nut threaded on said bolt, said nut securing said bolt at the center of the cross arm with the arm extending over the end of the barrel and being engaged beneath and the spring clip above the top wall of the hood, or, securing the bolt in the end of the slot with the said arm aligned with the cross bar of the yoke when said yoke is arranged astraddle the end of the barrel.

3. The combination of claim 1 wherein the spring clip is rigidly secured to the cross-bar of said yoke.

LUDWIG MEDITZ.

References Cited in the file of this patent

UNITED STATES PATENTS

| Number | Name | Date |
|---|---|---|
| 699,767 | Saxby | May 13, 1902 |
| 774,656 | Donnan | Nov. 8, 1904 |
| 1,129,106 | Lightfoot | Feb. 23, 1915 |
| 1,283,171 | Haussler | Oct. 29, 1918 |
| 1,879,412 | Mueller | Sept. 27, 1932 |
| 2,081,006 | Gallaway | May 18, 1937 |
| 2,386,394 | Grier | Oct. 9, 1945 |
| 2,394,231 | Burski | Feb. 5, 1946 |

FOREIGN PATENTS

| Number | Country | Date |
|---|---|---|
| 577,611 | France | June 7, 1924 |